Aug. 5, 1969 WOO F. CHOW 3,460,114

PLATED WIRE MEMORY PLANE

Filed Oct. 21, 1965

INVENTOR
WOO F. CHOW

BY

ATTORNEY

United States Patent Office 3,460,114
Patented Aug. 5, 1969

3,460,114
PLATED WIRE MEMORY PLANE

Woo F. Chow, Horsham, Pa., assignor to Sperry Rand Corporation, New York, N.Y., a corporation of Delaware Filed Oct. 21, 1965, Ser. No. 499,971
Int. Cl. G11b 5/62
U.S. Cl. 340—174 9 Claims

ABSTRACT OF THE DISCLOSURE

A memory plane is disclosed which provides a storage device having a low impedance characteristic. The storage element comprises a plated wire around which are placed two contoured conductors. The contoured conductors in combination with the magnetizable wires comprise a low impedance coaxial line.

Figure 1:
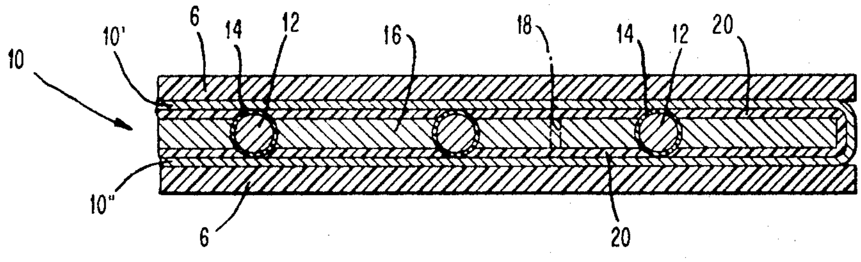

This invention relates to a memory plane and in particular relates to a memory plane for use with a plated wire memory element.

In certain memory applications employing plated wires, it is necessary that a bit located along the wire generate a relatively high power pulse (i.e., a relatively high voltage signal at a low impedance). A plated wire must generate a high power pulse when, for example, a bit or current steering technique is utilized. In accordance with this technique, the information stored in the first bit location along the plated wire is transferred to a second bit location along the same plated wire. This is accomplished by having the first bit location generate a pulse of sufficient power during a memory read (or search) cycle to transfer the information stored therein to a second bit location. This can only be accomplished if the voltage induced by a memory read out at the first location on the plated wire sees a low impedance so that a steering current is generated which is relatively large. Presently known memory planes have an impedance characteristic several orders of magnitude too large.

Accordingly, it is an object of this invention to provide a new and improved memory plane arrangement.

It is still another object of this invention to provide a new and improved memory plane arrangement for use with the plated wire storage element.

It is yet another object of this invention to provide a memory plane arrangement which is characterized by a relatively low impedance.

In accordance with a feature of this invention, a memory plane for use with a plated wire storage element is provided which is characterized by a word line or loop characteristic impedance of only a few ohms. This low impedance characteristic of the word loop is obtained by forming a coaxial line wherein the plated wire is the inner conductor of the line. The outer conductor of the coaxial line or its return is formed about a plastic or other thin insulating coating formed around the plated wire and is arranged so that it is contoured about a greater portion of the plated wire circumference.

In accordance with another feature of this invention, the drive and sense straps are symmetrically located with respect to the plated wires and their returns. The symmetrical characteristics of the drive strap makes the strap field which is generated more effective since the magnetic field which is generated acts equally on either side of the plated wire. The symmetrical orientation of the sense strap about the plated wires and their return also produces an improved output signal since the data flux couples equally to the strap lines during a sense cycle. The plated wire and its return path are also symmetrically arranged with respect to one another. This arrangement lowers the A.C. resistance of the word loop current and reduces the required strap current, voltage and power requirements.

In accordance with a further feature of this invention, the symmetrical arrangement of the plated wires and their return path enables the capacitive coupled noise on the read strap to be a minimum thereby increasing the signal to noise ratio.

Figure 2:
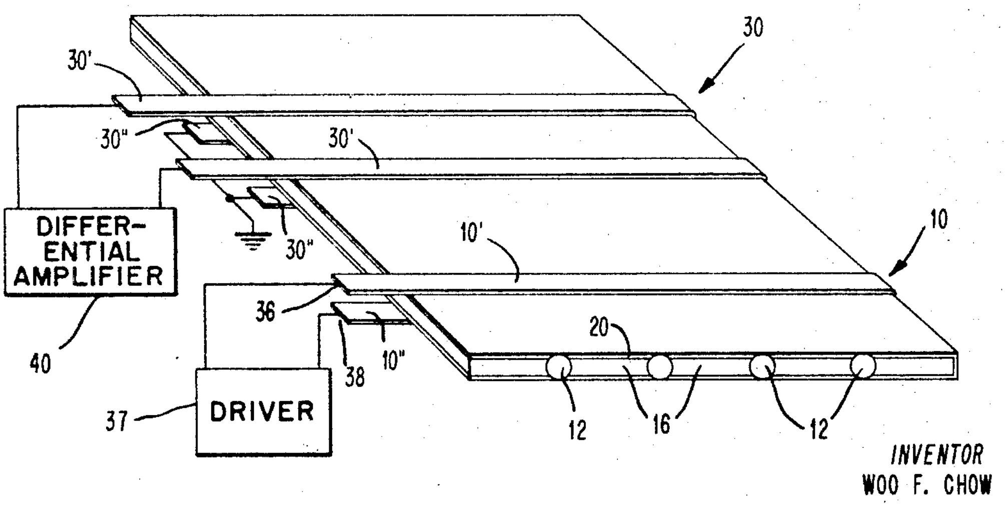

These and other features that are considered characteristic of this invention are set forth with particularity in the appended claims. The invention itself, however, both as to its organization and method of operation, as well as additional objects and advantages thereof will best be understood from the following description when considered in conjunction with the accompanying drawings wherein:

FIGURE 1 depicts the symmetrical relationship of the plated wires with respect to the associated drive lines and FIGURE 2 shows an isometric view of the memory plane of FIGURE 1 including two sense or read straps connected in the differential mode together with a single drive strap.

Referring now to FIGURE 1, the memory plane 5 is formed on the rigid dielectric material 6. The dielectric support 6 may be fabricated from any well known material and is utilized primarily as a support. A plurality of coaxial lines are located within the memory plane by positioning a plurality of plated wires 12 in parallel with respect to one another. The plated wires 12 are conventionally 5 mil diameter beryllium copper substrates upon whose surface are respectively formed a thin magnetic film. The thin magnetic film is electroplated on the wire substrate with approximately a 10,000 Angstrom thickness of permalloy (80% nickel-20% iron). The permalloy coating is electroplated in the presence of a circumferential magnetic field that establishes a uniaxial anisotropy axis at right angles (i.e., around the circumference) to the length of the wire. The uniaxial anisotropy establishes an easy and hard direction of magnetization and the magnetization vectors of the thin film are normally oriented in a first or second equilibrium position along the easy axis, thereby establishing two bistable states necessary for binary logic application.

A plastic or other insulating coating 14 is placed around the plated magnetic wires 12 for insulation and protection purposes. The insulating coating 14 is made very thin for reasons that will be discussed hereinafter.

Contoured around a large portion of the circumference of the plated wires 12 are copper returns 16. The copper returns 16 are symmetrically arranged about each side of the plated wires 12. If desired, each return 16 can be divided into 2 sections by a break 18, so that each plated wire which forms a word loop (i.e., all the bits of a word are located along a wire) is separated from the other.

The plated wire 12, the insulating thin coating 14 and the copper returns 16 formed on either side of a plated wire comprises a coaxial line. The impedance, $Zo$, of a coaxial line is a function of the thickness of the insulating coating 14 separating the inner conductor or plated wire 12 and the outer conductor or return 16. This is mathematically shown by the following formula, $$Zo=\frac{138}{\sqrt{\epsilon}}\,\mathrm{Log}_{10}\,\frac{c}{b}$$

wherein $\epsilon$ is the dielectric constant of the insulating material, $b$ is the radius of plated wire 12 and $c$ is the inside radius of the return. In other words, as the ratio of $c$ to $b$ approaches 1 the insulation becomes thinner. Therefore, as the logarithm of $c/d$ approaches zero, $Zo$ becomes very small.

Positioned about the coaxial structure provided by the plated wires 12 and the copper returns 16, is the plastic support 20. Located upon the plastic 20 and surrounding the coaxial lines are the orthogonally arranged drive strap 10 and sense strap 30. The straps 10 and 30 are conventionally 20 to 50 mils wide copper conductors. The plastic support 20 may be formed of any well known material and is utilized not only as a support for the strap conductors and to keep the plated wires 12 and the returns 16 properly oriented but further, to provide insulation between the strap and the plated wires and their returns.

The instant invention is utilized in such a manner that the plated wires 12 are the word lines or word loops. In other words, the various bits of a word are positioned along the length of the plated wires 12. Since the plated wires 12 are arranged as coaxial lines which have a characteristically low impedance, information can be transferred along the plated wire from one bit location to another bit location along the wire. This is of a particular importance in associative memory applications, for example, when a search is made for information in accordance with a search criterion. If the information recorded on the plated wire 12 is the same as the information required by the search criterion, no voltage is induced in the plated wire 12. On the other hand when a mismatch is obtained, a current is generated in the plated wire and this current must have sufficient power to set a flag register which is associated with the wire. This physical arrangement of plated wires and their returns are also important in logic applications with the magnetic thin film plated wires using the current steering technique.

Referring to FIG. 1, the strap conductors 10 comprising the upper strap 10′ and the lower strap 10″ are utilized as driving elements and are located equidistant from the center of each of the horizontally arranged plated wires 12. Accordingly, the drive strap conductors 10 and the plated wires 12 are symmetrically arranged with respect to one another. This enables an increased output signal to be induced in the plated wire since the magnetizing force that is generated by the strap during a read operation, for example, acts directly and equally on both sides of the magnetic coating of the plated wire. On the other hand, when the straps are utilized as a sensing element (30 in FIG. 2) instead of driving element, the symmetry of the sense strap with respect to the plated wires 12 and their respective returns 16 enables the traverse components of the data flux to couple equally to the upper and lower straps 30′ and 30″ thereby producing an increased output signal. The operation of the sense line 30 which detects data flux during a sensing operation is fully disclosed in the co-pending patent application of Woo F. Chow, Ser. No. 483,662, filed August. 30, 1965.

It was noted above that the copper return planes 16 are symmetrically arranged around each side of the plated wires 12. This symmetry produces several desirable effects. One such effect is that a lower A.C. resistance is obtained for the currents developed in the plated wires or word loops. The A.C. resistance is defined as the tendency of high frequency alternating current to concentrate in the surface layer of a conductor. This phenomenon is known as the skin effect. The effect increases with frequency. In the instant invention, the A.C. high frequency transient or skin effect current has more surface area upon which to flow because of the symmetrical copper return 16 thereby reducing the A.C. resistance. This arrangement is to be contrasted with prior art devices which have a higher A.C. resistance because the ground plane return surface surrounds only a relatively small portion of a plated wire. The skin effect, therefore, tends to become concentrated along the ground plane return around this small portion.

Another advantage that is derived from the symmetrically arranged plated wire 12 and its return 16 is that the capacitive coupled noise on the read strap 30 (FIG. 2) will be a minimum, thereby improving the signal to noise ratio. This results from the fact that the capacitive coupling from the copper return 16 and including the wires 12 to the respective legs 30′ and 30″ of the sense strap 30 are equal because of symmetry. If the capacitances are equal, then the voltage drops across the respective capacitances are equal when the strap 10 is energized by the single ended driver 37. These equal voltages will therefore be cancelled by a differentially connected amplifier 40. This may be explained in yet another way. If the drive strap 10 is driven in a push-pull manner by applying a signal from the driver 37 of equal amplitude but of opposite polarity to the two respective terminals 36 and 38 of the drive strap 10 and the capacitive coupling is equal (i.e., the distributed capacitance from leg 10′ to the ground plane return 16 including plated wires 12 and the distributed capacitance from leg 10″ to the ground plane return 16 including plated wires 12), then the voltage drops across the capacitances are equal and the ground plane 16 is at zero potential. Therefore, there is zero potential between the ground plane 16 and each leg 30′ and 30″ of the sense strap 30 and thus, there is no noise coupled thereto.

Another feature of the symmetrically arranged ground plane is that the ground plane return 16 including plated wires 12 assumes a voltage exactly one-half that of the applied voltage to the drive strap 10. By way of example, in the event that the drive strap 10 is energized in a push-pull manner, the ground plane 12 and the plated wires is at zero potential. Therefore, the dielectric thickness 20 between the respective drive strap 10′ and 10″ and the plated wires 12 and their respective return paths 16 need only be designed to withstand the voltage difference between the ground return 16 and the strap leg 10′ or 10″. This results in a reduction in thickness of the dielectric over prior art devices which must be designed to withstand a higher voltage difference because the capacitances are unequal. By reducing the dielectric thickness, the strap current is correspondingly reduced. This implies not only less power but also a smaller voltage driving the strap and the additional advantage of a well-controlled strap current since a smaller current can be regulated more easily.

In addition to the above mentioned electrical advantages derived from the symmetrical strap orientation, mechanical advantages are also provided. Thus, individual plated wires can be readily removed since the locations are slightly oversized. Furthermore, the plastic coating 14 on each plated wire fully protects it and prevents damage to the delicate magnetic coating.

In summary, this invention relates to a memory plane design which is characterized by a low impedance return path for the word lines and symmetrical electrical characteristics for the read and drive straps with respect to the plated wires and their return paths. The symmetrical properties makes the strap field more effective, reduce the noise pick-up, reduce the insulation required to withstand the voltage on the strap as well as reducing the required strap current for a given strap field.

Obviously many modifications and variations of the present invention are possible in the light of the above teachings. It is therefore to be understood that within the scope of the appended claims, the invention may be practiced otherwise than specifically described.

The embodiments of the invention in which an exclusive property or privilege is claimed are defined as follows.

What is claimed is:

1. In combination, (a) a plurality of magnetizable wires arranged substantially in parallel, said wires being spaced equidistant from one another;

(b) an insulator surrounding each said magnetizable wire;

(c) a non-conductive support means holding said wires in parallel;

(d) a conductive means "interposed" between adjacent magnetizable wires and said support wherein said conductive means oriented on either side of a magnetizable wire is symmetrically arranged, said conductive means filling the space provided by said support and two adjacent wires;

(e) a drive line positioned upon said insulator which is arranged orthogonal to said wires.

2. In combination, (a) a plurality of magnetizable wires arranged substantially in parallel;

(b) an insulator surrounding each said magnetizable wire;

(c) a conductive means interposed between each said magnetizable wire wherein said conductive means located on either side of a single magnetizable wire is symmetrically arranged therewith;

(d) means to apply a magnetic field to said magnetizable wires being symmetrically and orthogonally arranged therewith;

(e) means to sense a magnetic field emanating from said magnetizable wires being symmetrically and orthogonally arranged therewith.

3. In combination, (a) a plurality of magnetizable wires arranged in a row and equally spaced from one another;

(b) a non-conductive support means surrounding said wires;

(c) a shaped conductive member positioned between two adjacent wires and said non-conductive support means, said conductive member being contoured to surround said two adjacent wires;

(d) a drive line positioned upon said support means and surrounding said wires in an orthogonal manner.

4. The combination in accordance with claim 3 wherein two straps are connected to one another to detect a signal differentially.

5. The combination in accordance with claim 3 wherein means are interposed intermediate said shaped conductive member to electrically isolate each half.

6. The combination in accordance with claim 3 wherein said wires comprise a wire substrate with a magnetic plating having the property of uniaxial anisotropy.

7. The combination in accordance with claim 6 wherein a protective covering is applied to said plated wire.

8. The combination in accordance with claim 3 wherein said non-conductive support means is grooved to support and position said wires.

9. In combination, (a) a plurality of magnetizable wires arranged substantially in parallel;

(b) an insulator surrounding each said magnetizable wire;

(c) a support means holding said wires in parallel such that said support is juxtaposed to said wires on opposite sides of a diameter through each;

(d) a conductive means interposed between each said magnetizable wire and said support wherein said conductive means located on either side of a single magnetizable wire is symmetrically arranged therewith;

(e) means to apply a magnetic field to said magnetizable wires;

(f) means to sense a magnetic field emanating from said magnetizable wires.

References Cited

UNITED STATES PATENTS 3,371,326 2/1968 Fedde ---------------- 340—174

JAMES W. MOFFITT, Primary Examiner